(12) United States Patent
Patterson et al.

(10) Patent No.: US 10,089,889 B2
(45) Date of Patent: Oct. 2, 2018

(54) UNMANNED AERIAL VEHICLE FOR SITUATIONAL AWARENESS TO FIRST RESPONDERS AND ALARM INVESTIGATION

(71) Applicant: Scott Technologies, Inc., Boca Raton, FL (US)

(72) Inventors: Jason M. Patterson, Monroe, NC (US); William Eugene Parson, Indian Trail, NC (US); Jerry Alan Phifer, Peachland, NC (US); Jason Richard Cannon, Pasadena, MD (US); Darrill Lee Plummer, Midland, NC (US); Cedric Williams, Harrisburg, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 0 days.

(21) Appl. No.: 15/319,621

(22) PCT Filed: Jun. 19, 2015

(86) PCT No.: PCT/US2015/036709
§ 371 (c)(1),
(2) Date: Dec. 16, 2016

(87) PCT Pub. No.: WO2015/196081
PCT Pub. Date: Dec. 23, 2015

(65) Prior Publication Data
US 2017/0124885 A1 May 4, 2017

Related U.S. Application Data

(60) Provisional application No. 62/014,283, filed on Jun. 19, 2014.

(51) Int. Cl.
*G08G 5/00* (2006.01)
*B64C 39/02* (2006.01)
*G05D 1/10* (2006.01)

(52) U.S. Cl.
CPC ......... *G08G 5/0069* (2013.01); *B64C 39/024* (2013.01); *G05D 1/101* (2013.01);
(Continued)

(58) Field of Classification Search
CPC ........ B64C 39/02; B64C 39/024; G08G 5/00; G08G 5/0069; G08G 5/50034; G05D 1/10
(Continued)

(56) References Cited

U.S. PATENT DOCUMENTS 8,346,578 B1 * 1/2013 Hopkins, III .......... G06Q 40/00
382/100
9,046,892 B2 * 6/2015 Jang .................... G06Q 10/0631
(Continued)

OTHER PUBLICATIONS

International Search Report and Written Opinion of the International Searching Authority, dated Oct. 14, 2015, for International Application Serial No. PCT/US2015/036709, International Filing Date Jun. 19, 2015, consisting of 5-pages.
(Continued)

*Primary Examiner* — Tan Q Nguyen
(74) *Attorney, Agent, or Firm* — Christopher & Weisberg, P.A.

(57) ABSTRACT

A device, and method, for situational awareness of an emergency scene for first responders uses an unmanned aerial vehicle equipped with a sensor package in populated or otherwise restricted areas. The unmanned aerial vehicle is assigned to a control center for a designated incident while automatically tasking the unmanned aerial vehicle with the initiation of the incident response to autonomously proceed (Continued)

to the incident prior the control center taking active control of the unmanned aerial vehicle.

19 Claims, 3 Drawing Sheets

(52) U.S. Cl.
CPC ...... *G08G 5/0034* (2013.01); *B64C 2201/021* (2013.01); *B64C 2201/12* (2013.01)

(58) Field of Classification Search
USPC .......................................................... 701/2, 3
See application file for complete search history.

(56) References Cited

U.S. PATENT DOCUMENTS

| 2006/1143424 | | 6/2006 | Matsuzaki |
| 2010/0250022 | A1 | 9/2010 | Hines et al. |
| 2014/0077969 | A1 | 3/2014 | Vian |
| 2015/0363717 | A1* | 12/2015 | Lim .................. G06Q 10/0633 705/4 |
| 2016/0093212 | A1* | 3/2016 | Barfield, Jr. .......... H04N 7/185 348/144 |
| 2016/0247404 | A1* | 8/2016 | Srivastava ............. G01C 21/20 |
| 2016/0363929 | A1* | 12/2016 | Clark .................. G05D 1/0011 |

OTHER PUBLICATIONS

Beard et al.: "Cooperative Forest Fire Surveillance Using a Team of Small Unmanned Air Vehicles.", BYU Scholars Archive., vol. 37, No. 6, Jan. 1, 2006 (Jan. 1, 2006), pp. 351-360, XP055247260, ISSN: 0020-7721.
Pena et al.: "UAVs Integration in the SWIM Based Architecture for ATM.", Journal of Intelligent and Robotic Systems., vol. 54, No. 1-3, Oct. 31, 2008 (Oct. 31, 2008), pp. 39-59, XP019644167, ISSN: 1573-0409.
Valavanis et al: "Unmanned Aircraft Systems.", International Symposium on Unmanned Aerial Vehicles, (2009) pp. 39-78 ; 163-182.
International Extended Search Report for EP 15809437.5 (dated Jan. 26, 2018) (3 pages).

\* cited by examiner

UNMANNED AERIAL VEHICLE FOR SITUATIONAL AWARENESS TO FIRST RESPONDERS AND ALARM INVESTIGATION

CROSS-REFERENCE TO RELATED APPLICATIONS

This application is a Submission under 35 U.S.C. § 371 for U.S. National Stage Patent Application of, and claims priority to, International Application Number PCT/US2015/036709, filed Jun. 19, 2015, entitled "UNMANNED AERIAL VEHICLE FOR SITUATIONAL AWARENESS TO FIRST RESPONDERS AND ALARM INVESTIGATION", which is related to and claims priority to Provisional Patent Application No. 62/014,283, filed Jun. 19, 2014, the entire contents of both of which are hereby incorporated herein by reference.

The present disclosure relates generally to Unmanned Aerial Vehicles (UAV) use by first responders and alarm investigation for situational awareness.

SUMMARY OF THE PRESENT INVENTION

A device, and method, for situational awareness of an emergency scene for first responders uses a UAV equipped with a sensor package in populated or otherwise restricted areas.

DETAILED DESCRIPTION OF THE PREFERRED EMBODIMENT

Referring to the figures, the invention includes an Unmanned Aerial Vehicle (UAV) 10 equipped with a sensor package 20 that can be used by first responders 30 for enhancing their situational awareness 100 on an emergency scene 210, particularly in urban or other densely populated areas.

Figure 1:
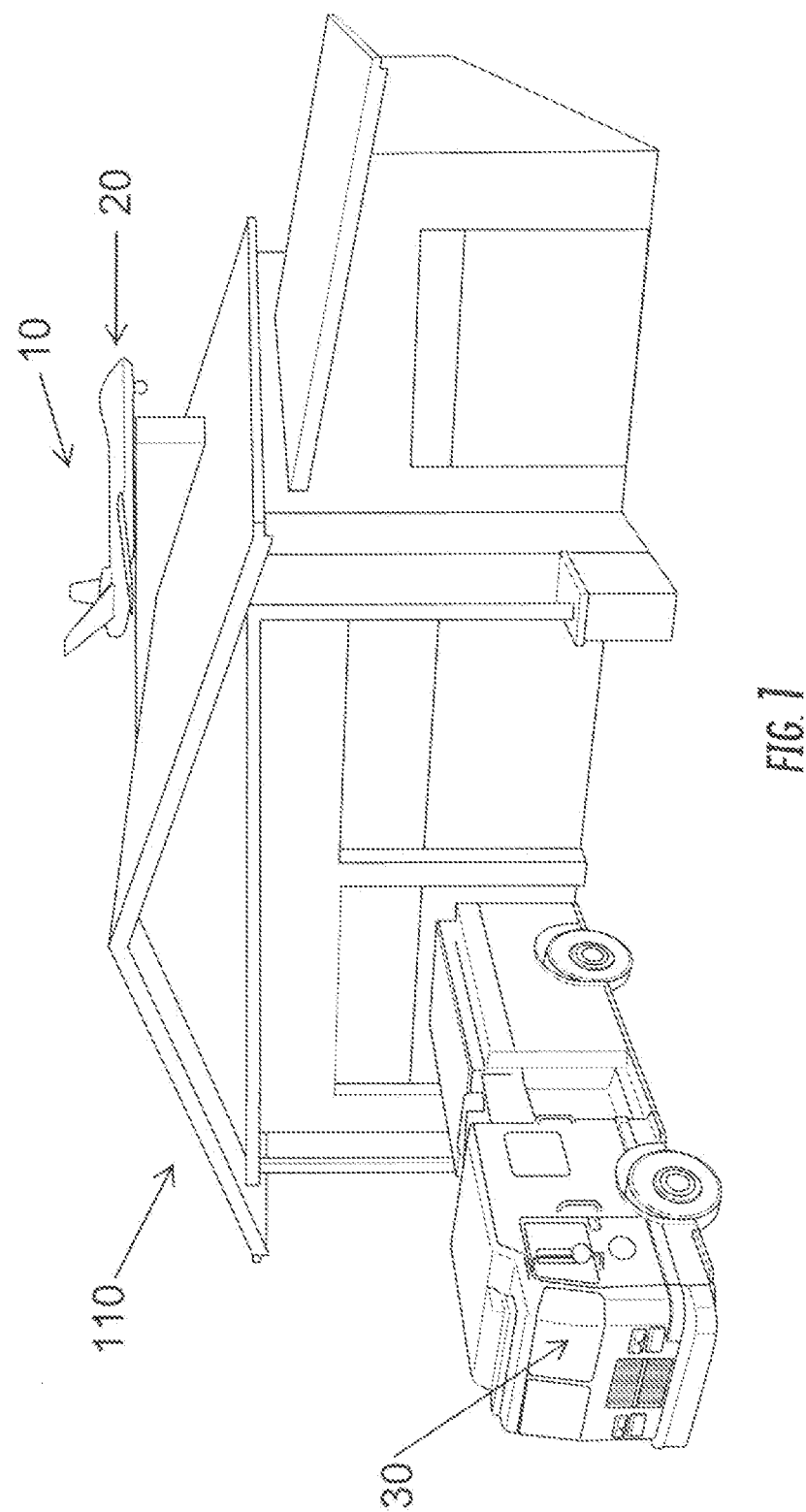
FIG. 1 shows a UAV launch from a central location.
Figure 2:
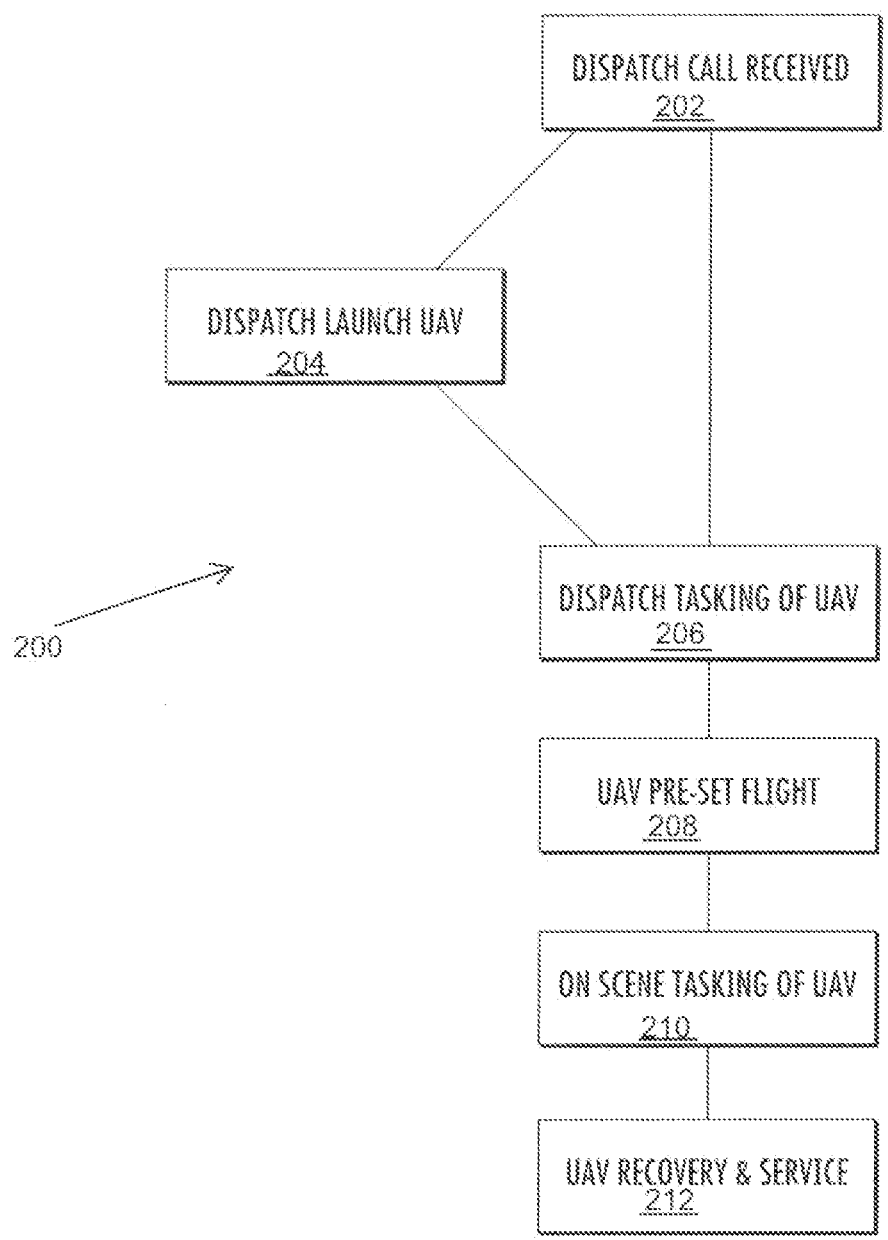
FIG. 2 shows a process chart for launch and control of a UAV for implementing situational awareness; and, FIG. 3 shows a standardized flight pattern of a UAV for situational awareness for first responders.

As seen in FIG. 1, the UAV 10 is launched from a central location 110, such as a storage area, firehouse, police station, or other like controllable and localized location, to minimize flight time to a destination. Referring to FIG. 2, the launch and operation 200 of the UAV can be initiated automatically, remotely, or on scene with the UAV at its storage location. Launch 204 of the UAV is preferably initiated by the receipt of a dispatch call 202, which may be initiated as an emergency call for fire, medical or police action, e.g., 911 call, which is routed to an emergency team operator. With receipt and confirmation of the emergency call, the emergency team operator This dispatch call, for example, may be similar to the dispatch call issued to fire fighters or fire stations to initiate the movement of first responders or fire fighter to an emergency scene.

Figure 3:
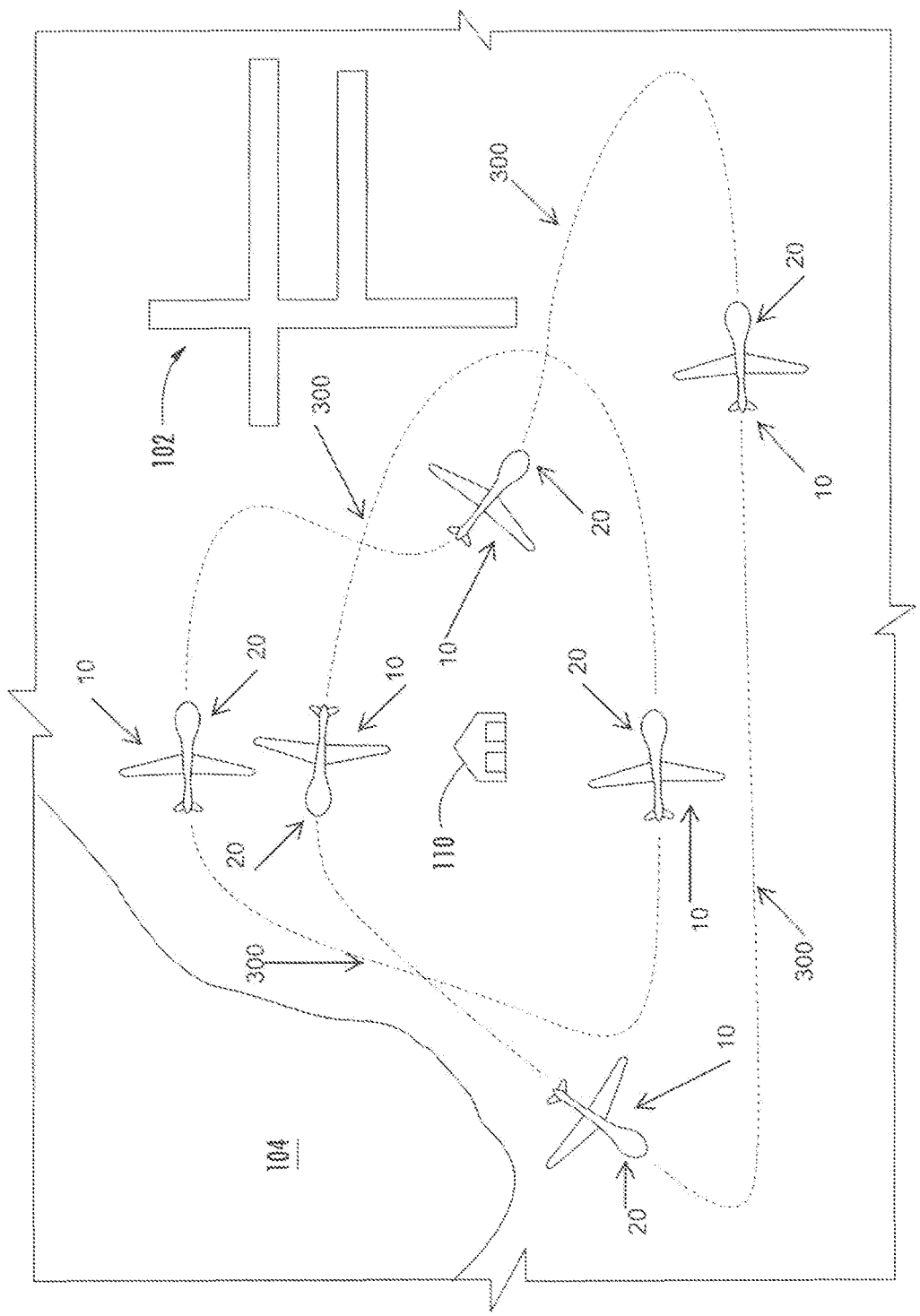

Concurrent with the dispatch call locational data is provided, generally through call locator procedures. This positioning of the emergency is preferably converted to GPS coordinates for UAV tasking 206 that is transmitted to the UAV for pre-set UAV flight 208. The UAV 10, after launch, travels to the emergency scene self-guided, using the geological location information transmitted to it in the dispatch, or using reference locations previously determined. Alternatively, as seen in FIG. 3, one or more UAVs may remain in a flight pattern 300 prior to the dispatch call to arrive on station at the emergency site quicker or to engage multiple UAVs 10 onto a given emergency for a single site. Such flight patterns 300, either in transit to the emergency location or in a standby prior to the dispatch call, avoids restricted airspace, such as military bases 104, airports 102 and other such prohibited flying locations.

Pre-set UAV flights instruct the UAV 10 to follow prescribed travel routes 300 within defined flight corridors for heavily used airspace. As such, these travel routes provide transit of the UAV 10 to the emergency scene free from active human guidance, and error. Unauthorized diversion of the UAV 10 for unpermitted uses is minimized. This prescribe pre-set flight 300 overcomes obstacles of using the UAV 10 in populated areas by including an ability of the UAV 10 to adhere to local, state or federal laws and regulations, while minimizing the complex skill set for controlling the UAV 10 in such an environment. Once on station the on-scene commander obtains operational control and tasking 210 of the UAV 10, with such operational control restricted by the pre-set flight parameters of the UAV 10. When the UAV 10 arrives at the emergency scene it will enter a prescribed loitering pattern around the scene. The UAV 10 will notify the base or mobile receivers that it has arrived on scene, and begin transmitting video or other data from its sensor package in real time. The UAV 10 can at any time be allowed to loiter in a prescribed pattern, or alternative loiter in other prescribed patterns, or hold a constant location or be guided by the base or mobile receiver to a specific location or in a specific pattern, or any combination of the above.

The UAV 10 may be allowed to remain at the scene until such time as the power source for flight is reduced to that to return to base 212, at which time the UAV 10 will travel back to base in a prescribed flight path. The UAV 10 may have the ability to remain on scene and be recovered by the mobile operator when the power source for flight becomes exhausted. The UAV 10 may include the ability to be re-routed or recalled by the base or mobile receiver at any time during its travel. Once on station, and at other times as determined for operational efficiency, the UAV 10 may include the ability to transmit video via email, data transmission to a data storage site or to a receiver at a fixed location or a mobile station, such as a fire fighter enroute to an emergency scene. This data transmission may be tailored to specific recipients to highlight functions, tasks or dangers to aid in an operational emergency response. Preferably the UAV 10 has the ability to transmit its location constantly, or at prescribed intervals via email, data transmission to a data storage site or to a receiver at a fixed location or a mobile station, such as a fire fighter enroute to an emergency scene.

In a preferred embodiment UAV 10 dispatch is programmed to initiate with the activation of the first responders from an emergency notification, e.g., 911 call. UAV 10 dispatch may occur with the activation of a prepositioned UAV 10 ready for launch, a UAV 10 already in flight, e.g., in a pre-positioning set patrol mode, or a UAV 10 presently tasked in an activation mode, e.g., already on the scene of a different event. As such with the receipt of an emergency request, e.g., 911 call, the UAV 10 activation/tasking is initiated with the subsequent first responder tasking.

In one preferred embodiment in combination with the tasking of a first responder response a pre-set, non-flying, UAV 10 dispatch is programmed to initiate as part of the general dispatch of the first responders. For example, with the activation received by a fire station an independent UAV 10 auto-launch occurs. The UAV 10 is automatically, in combination with the fire station activation, sent to the initial dispatched address/location, if address is within approved UAV 10 airspace to fly. Alternatively, dispatch/command center assumes control of UAV 10 at any time within the launch authorization of the fire station activation. This control may be further delegated by dispatch to hand over UAV 10 control to the dispatched fire station safety officer or designated fire department personnel.

In another preferred embodiment command/control/re-routing of a loitering UAV 10 occurs with the re-routing of a loitering UAV 10 to another address/location, if address is within approved UAV 10 airspace to fly. Alternatively, dispatch/command center assumes control of UAV 10 at any time within the launch authorization of the fire station activation. This control may be further delegated by dispatch to hand over UAV 10 control to the dispatched fire station safety officer or designated fire department personnel.

In a further preferred embodiment the command center (dispatch) has control of UAV 10 or alternatively UAV 10 control is by the fire department safety officer or designated personnel in a return to base order which can be executed by command center (dispatch) or executed by the fire department safety officer or designated personnel.

UAVs preferably carry designated payload sensor packages for first responder support, including for example, visible or infrared video or sequenced still images, gas detection sensors that wireless transmit what gases and concentrations are present real time, communication hub for emergency services (mobile tower), and the like.

Example 911 dispatch voice over a pager or in text form (voice or txt info is the same)
CAD:3923 LANCASTER HWY;
MONROE;2014275627;STRUCTURE FIRE
EFD;S16;D-ST;LONG HOPE RD;GRIFFITH RD;
10/30/2014 05:10:03
1.) CAD # (2014275627) is logged for future reference
2.) Street address of the call is given
3.) Call designation, "STRUCTURE FIRE"
4.) Emergency Fire Department assigned—"S16"
5.) Radio operation channel "D-ST"—Delta State in this example
6.) Cross roads closest to the scene address "LONG HOPE RD" and "GRIFFITH RD"
7.) Date & time of dispatch With the activation of the fire station, common information is supplied for UAV initiation with:
8.) CAD # (2014275627) assigned to tasked UAV
9.) Street address converted to geolocation position for tasking flight
10.) Call designation, "STRUCTURE FIRE" initiating pre-set tasking for arrival flight pattern, on-scene flight plan (e.g., route, altitude, speed, etc.)
11.) Emergency Fire Department assignment—"S16" presetting communication protocols for UAV with designated control units.
12.) Radio operation channel "D-ST" providing an open channel for UAV to provide communication assistance with on-scene communications, also used in the calculation of the arrival flight pattern and on-scene flight pattern to maximize communications with other rated tasking of the UAV.
13.) Cross roads closest to the scene address "LONG HOPE RD" and "GRIFFITH RD" providing a reference point for communication with the arriving fire department for providing safe entry of the fire department to the scene, e.g., identifying hazards in the area such as oil tanks, smoke patterns in the area, location of other emergency teams, schools in area, etc.
14.) Date & time of dispatch providing a common reference time for monitoring UAV progress to the location Preferably UAVs are pre-positioned, in flight and non-flight, to most expeditiously arrive at an emergency while permitting safe operations, timely and efficient maintenance and security of the UAV. In flight UAVs are programmed to fly in designated airspace while being spaced from one another to most efficiently cover the maximum amount of coverage at all times. In a ground positioning mode, the UAVs are preferably pre-positioned in different locations to permit most timely arrival of the UAV regardless of the location of the incident. Preferably the UAV are positioned at facilities that allow for efficient maintenance and security, such as police stations, fire stations, governmental building and/or contracted spaces with secure entry protocols.

The UAV 10 preferably includes the ability to detect other aircraft and/or include the ability to identify itself to other aircraft or to tracking locations through the use of radio beacons, identifiers, lights, etc. Additionally, the UAV 10 may include the ability to avoid other aircraft or obstacles identified prior to its launching or through the use of sensing means while in flight.

The UAV 10 carries an instruments or sensor package 20 designed for operational support of an emergency response, including for example without limitation, visible and infrared data collection, audio collection, gas sensor detection, communications relay, public announcement capabilities, and the like. Representative sensor packages 20 of the UAV 10 may include any one or combination of visual light cameras, long wave infrared cameras, short wave infrared cameras, multi-spectral cameras, stabilization, pan, tilt, zoom capability for cameras, GPS locational devices, gas detection sensors and aircraft transponder. The sensor package 20 allows the UAV 10 to survey the emergency scene, preferably analyzing smoke and wind patterns, traffic congestion, and other such factors that may affect the firefighting performance of the first responders. Preferably "smart" analytics is utilized to convert the raw information into more useful information for the first responder. When receiving the information, mobile device applications ("apps") may be used to access the raw and/or processed information. As a mobile sensor package 20, preferably the package 20 is lightweight, low cost sensor platform 20 that can be plugged into the drone, and more preferably interchangeable between platforms, such as within robots, boats and other such platforms that optimize firefighting capability.

In one preferred embodiment, the UAV 10 is used to locate and record the more heat intense locations ("hot spots") within the operational area. As such the UAV 10 can have the capability to enter into a location, e.g., a building, or send a probe into the location, to more specifically locate, identify, categorize or otherwise quantify the hot spot. Additionally the UAV 10 can utilize feature recognition for searching and locating first responders and/or other individuals within the operational area. Representative locational devices may include RFID location of the first responders. Multiple UAVs can be used to provide 3D mapping of the operational area for better on scene situational surveillance.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for emergency response, the system comprising at least one unmanned aerial vehicle being configured to:
   be automatically activated by receipt by the unmanned aerial vehicle of an emergency response dispatch call containing location information;
   receive a pre-set flight path to an emergency scene destination, the emergency scene destination being established by the location information of the emergency response dispatch call; and
   use facial recognition to locate a first responder at the emergency scene.

2. The system of claim 1, wherein each of the at least one unmanned aerial vehicle includes a sensor package.

3. The system of claim 2, wherein the sensor package includes at least one of a visual light camera, a long wave infrared camera, a short wave infrared camera, and a multi-spectral camera.

4. The system of claim 2, wherein the sensor package includes at least one of a GPS locational device, an audio recorder and a gas detection sensor.

5. The system of claim 2, wherein the sensor package includes an aircraft transponder.

6. The system of claim 2, wherein each of the at least one unmanned aerial vehicle is configured to determine a heat intense location.

7. The system of claim 2, wherein the sensor package of each of the at least one unmanned aerial vehicle is configured to produce image data, the image data of the at least one unmanned aerial vehicle being combinable to produce a three-dimensional image.

8. The system of claim 2, wherein the sensor package is configured to analyze at least one of smoke and wind patterns to aid first responders.

9. The system of claim 1, wherein the pre-set flight path is within a prescribed travel route.

10. The system of claim 1, wherein the pre-set flight path includes a loitering pattern at the target destination.

11. The system of claim 1, wherein each of the at least one unmanned aerial vehicle is configured to automatically begin transmission of data to a command location once the at least one unmanned aerial vehicle arrives at the target destination.

12. The system of claim 1, wherein each of the at least one unmanned aerial vehicle is further configured to receive manual control instructions from a command location.

13. The system of claim 12, wherein the command location is one of a fire station and a police station.

14. The system of claim 12, wherein each of the at least one unmanned aerial vehicle is configured to alert the command location when each of the at least one unmanned aerial vehicle is at the target destination.

15. The system of claim 1, wherein each of the at least at least one unmanned aerial vehicle includes a power source having a power status, each of the at least one unmanned aerial vehicle being configured to automatically return to a base location based on a power status of the power source.

16. A system for emergency response, the system comprising at least one unmanned aerial vehicle, each of the at least one unmanned aerial vehicle having a sensor package that:
   receives a pre-set flight path to an emergency scene, the at least one unmanned aerial vehicle being automatically activated by the receipt by the unmanned aerial vehicle of an emergency response dispatch call containing location information, the emergency scene being established by the location information of the emergency response dispatch call;
   records data about the target destination and communicates the data to a command location;
   uses facial recognition to locate a first responder at the emergency scene; and
   is configured to receive manual control instructions from the command location.

17. The system of claim 16, wherein the sensor package includes at least one of: a visual light camera, a long wave infrared camera, a short wave infrared camera, a multi-spectral camera, a GPS locational device, an audio recorder, a gas detection sensor, an aircraft transponder, and an RFID transceiver.

18. A method for automatically tasking an unmanned aerial vehicle with an incident response task at an emergency scene, the method comprising:
   transmitting to the unmanned aerial vehicle an emergency response dispatch call, the emergency response dispatch call containing location information about the emergency scene, the unmanned aerial vehicle being configured to be automatically activated by the emergency response dispatch call and to use facial recognition to locate a first responder at the emergency scene, activation of the unmanned aerial vehicle causing the unmanned aerial vehicle to travel to the emergency scene using a prescribed travel route; and
   routing the emergency response dispatch call to an emergency team operator.

19. The method of claim 18, wherein the unmanned aerial vehicle includes a sensor package that is configured to record and transmit data to the emergency team operator, the method further comprising at least one of:
   locating a first responder at the emergency scene using at least one of an RFID transceiver, a GPS locational device, and a feature recognition device in the sensor package;
   identifying a heat intense location at the emergency scene using the sensor package;
   recording video data from the emergency scene and transmitting the video data, the video data being recorded by at least one of a visual light camera, a long wave infrared camera, a short wave infrared camera, and a multi-spectral camera in the sensor package; and
   transmitting a location of the unmanned aerial vehicle using the GPS locational device in the sensor package.

* * * * *